United States Patent
Kim et al.

(10) Patent No.: US 12,386,661 B2
(45) Date of Patent: Aug. 12, 2025

(54) APPARATUS AND METHOD FOR EXECUTING AUTOMATION SCENARIO IN PARALLEL

(71) Applicant: SAMSUNG SDS CO., LTD., Seoul (KR)

(72) Inventors: Hyo Young Kim, Seoul (KR); Jae Cheol Lee, Seoul (KR); Koo Hyun Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 512 days.

(21) Appl. No.: 17/972,997

(22) Filed: Oct. 25, 2022

(65) Prior Publication Data
US 2023/0126185 A1    Apr. 27, 2023

(30) Foreign Application Priority Data
Oct. 25, 2021 (KR) .................... 10-2021-0142698

(51) Int. Cl.
*G06F 9/46* (2006.01)
*G06F 9/38* (2018.01)
*G06F 9/445* (2018.01)
*G06F 9/48* (2006.01)

(52) U.S. Cl.
CPC .......... *G06F 9/4887* (2013.01); *G06F 9/3838* (2013.01); *G06F 9/44505* (2013.01)

(58) Field of Classification Search
CPC ... G06F 9/4887; G06F 9/3838; G06F 9/44505
See application file for complete search history.

(56) References Cited

U.S. PATENT DOCUMENTS

| | | | |
|---|---|---|---|
| 10,877,799 B2 * | 12/2020 | Bahl | G06F 9/4881 |
| 11,461,669 B2 * | 10/2022 | von Trapp | G06N 7/01 |
| 2012/0330474 A1 * | 12/2012 | Kreider | F22B 37/003 |
| | | | 702/34 |
| 2021/0072996 A1 * | 3/2021 | Chen | G06F 9/3838 |
| 2021/0173718 A1 * | 6/2021 | Patel | G06F 40/295 |
| 2023/0050430 A1 * | 2/2023 | Piau | G06F 9/5038 |

FOREIGN PATENT DOCUMENTS

| | | | | |
|---|---|---|---|---|
| CN | 112286665 A | * | 1/2021 | ........... G06F 9/4843 |
| EP | 3438821 A1 | * | 2/2019 | ........... G06F 9/4837 |
| KR | 102261793 B1 | * | 6/2021 | ......... G06Q 10/1097 |

* cited by examiner

*Primary Examiner* — Diem K Cao
(74) *Attorney, Agent, or Firm* — Sughrue Mion, PLLC (57) ABSTRACT

The apparatus includes a section extraction module configured to receive an automation scenario including a plurality of sections, and to extract one or more sections of a plurality of job types, from among the plurality of sections, the one or more sections being executable in parallel, a section optimization module configured to generate a parallel execution section list by sorting the one or more sections based on priorities predetermined for the plurality of job types and a job scheduler configured to generate an idle bot list including an idle bot having an idle state between an execution start time and an execution end time of the automation scenario, and to match the idle bot included in the idle bot list to each of the one or more sections included in the parallel execution section list with reference to the at least one expected execution time period and the priorities.

10 Claims, 13 Drawing Sheets

| SECTION ID | JOB TYPE | JOB ID | START JOB SEQUENCE NUMBER | END JOB SEQUENCE NUMBER |
|---|---|---|---|---|
| Section_001 | FIRST JOB TYPE THIRD JOB TYPE | Job_001 | 10 | 20 |
| Section_002 | SECOND JOB TYPE | Job_001 | 40 | 60 |
| ⋮ | ⋮ | ⋮ | ⋮ | ⋮ |
| Section_100 | SECOND JOB TYPE THIRD JOB TYPE | Job_041 | 0 | 20 |

| SECTION ID | PRIORITY SCORE | EXPECTED EXECUTION TIME PERIOD (sec) | JOB TYPE | JOB ID | START JOB SEQUENCE NUMBER | END JOB SEQUENCE NUMBER |
|---|---|---|---|---|---|---|
| Section_001 | 5 | 400 | FIRST JOB TYPE THIRD JOB TYPE | job_001 | 10 | 20 |
| Section_002 | 5 | 300 | SECOND JOB TYPE | job_001 | 40 | 60 |
| ... | | | ... | ... | ... | ... |
| Section_100 | 8 | 100 | SECOND JOB TYPE THIRD JOB TYPE | job_041 | 0 | 20 |

CHARACTERISTIC INFORMATION FOR EACH SECTION

| BOT ID | IDLE START TIME | IDLE END TIME |
|---|---|---|
| Bot_001 | 2021.09.05 14:00:00 | 2021.09.05 15:00:00 |
| Bot_002 | 2021.09.05 15:00:00 | 2021.09.05 16:00:00 |
| ⋮ | ⋮ | ⋮ |
| Bot_005 | 2021.09.05 15:00:00 | 2021.09.05 20:00:00 |

FIG. 7

| BOT ID | IDLE START TIME | IDLE END TIME | SECTION ID | EXECUTION START TIME | EXECUTION END TIME |
|---|---|---|---|---|---|
| Bot_001 | 2021.09.05 14:00:00 | 2021.09.05 15:00:00 | Section_002 | 2021.09.05 14:00:00 | 2021.09.05 14:30:00 |
| Bot_002 | 2021.09.05 15:00:00 | 2021.09.05 20:00:00 | Section_007 | 2021.09.05 15:00:00 | 2021.09.05 15:40:00 |
| ... | ... | ... | ... | ... | ... |
| Bot_005 | 2021.09.05 15:00:00 | 2021.09.05 20:00:00 | Section_030 | 2021.09.05 15:00:00 | 2021.09.05 16:00:00 |

APPARATUS AND METHOD FOR EXECUTING AUTOMATION SCENARIO IN PARALLEL

CROSS-REFERENCE TO RELATED APPLICATION(S)

This application claims benefit of priority to Korean Patent Application No. 10-2021-0142698 filed on Oct. 25, 2021 in the Korean Intellectual Property Office, the disclosure of which is incorporated herein by reference in its entirety.

BACKGROUND

1. Field

One or more example embodiments relate to a robotic process automation (RPA) technology in which repetitive and simple tasks are automatically performed according to a predetermined rule.

2. Description of Related Art

Robotic process automation (RPA) technology relates to a software robot (hereinafter referred to as a "bot") performing repetitive tasks that were previously performed by humans, and repetitive and simple tasks, such as email reception/sending, document creation, data recording/re-entry, and the like, are automatically performed according to a predetermined rule.

In order to perform such automated tasks, a bot group including a large number of automated bots needs to exist, and it is important to maximize the efficiency of bots through scheduling, such that tasks are not concentrated only on specific bots. When the efficiency of the bot decreases, it may directly lead to loss of time and money, so the company adopting RPA may prioritize bot scheduling.

A general scheduler runs by distributing tasks such that there are no idle-state bots in the bot group. When tasks are distributed such that the number of idle-state bots is minimized, the efficiency of the bots may be maximized. However, due to a difference between execution time periods of respective automation scenarios, an idle-state bot may inevitably occur. Even if there is an idle-state bot, only one bot performing the automation scenario may be executed and the remaining bots may remain in an idle state when one automation scenario continues for a relatively long execution time period.

According to the related art, in order to improve the efficiency of the bot group, an automation scenario creator divides an automation scenario into multiple scenarios in consideration of the execution time period of the scenario, or properly registers the automation scenario in the scheduler such that there is no idle-state bot. However, it is inefficient in that i) it is necessary to depend on the individual's skill level or domain knowledge for the task, and ii) a person schedules every automation scenario in consideration of the execution time period, and there is a limitation in optimization.

SUMMARY

An aspect is to maximize efficiency of a bot by extracting a section in which distributed parallel processing is possible from among sections of an automation scenario, and assigning the extracted sections to an idle-state bot at a corresponding time point for distributed parallel processing.

According to an aspect, there is provided an apparatus for executing an automation scenario in parallel, the apparatus including a processor and a memory storing one or more programs configured to be executed by the processor. The one or more programs include instructions for the following: a section extraction module configured to receive an automation scenario including a plurality of sections, and to extract one or more sections, executable in parallel, for each job type among the plurality of sections based on a script language constituting the automation scenario, a section optimization module configured to calculate an expected execution time period of each of the extracted sections, and to generate a parallel execution section list by sorting the sections based on a priority predetermined for each job type, and a job scheduler configured to generate an idle bot list including an idle bot having an idle state between an execution start time and an execution end time of the automation scenario, and to match the idle bot included in the idle bot list to each of the sections included in the parallel execution section list with reference to the expected execution time period and the priority.

The section extraction module may be configured to extract one or more of a first job type section existing in a set repetitive statement, a second job type section independently and repeatedly using a specific variable a set number of times or more, and a third job type section operable without interaction with a user interface of a target system.

The section optimization module may be configured to calculate the expected execution time period of each of the sections with reference to an execution history database in which an execution history corresponding to each job ID is stored, and to calculate a value obtained by summing maximum execution time periods of respective activities included in a section corresponding to a specific job ID as an expected execution time period of specific section, when there is no execution history corresponding to the specific job ID.

The section optimization module may be configured to remove a section having a lowest priority among overlapping sections, when overlapping sections among the sorted sections are present, and to repeatedly perform removal according to the priority until the overlapping sections disappear.

The job scheduler may be configured to select a section in which each idle bot included in the idle bot list is usable during an idle time period from among the sections included in the parallel execution section list using the expected execution time period, and to match each selected section to each idle bot in order of higher priority.

According another aspect, there is provided a method for executing an automation scenario in parallel, the method including receiving, by a section extraction module, an automation scenario including a plurality of sections, extracting, by the section extraction module, one or more sections, executable in parallel, for each job type among the plurality of sections based on a script language constituting the automation scenario, calculating, by a section optimization module, an expected execution time period of each of the extracted sections, generating, by the section optimization module, a parallel execution section list by sorting the sections based on a priority predetermined for each job type, generating, by a job scheduler, an idle bot list including an idle bot having an idle state between an execution start time and an execution end time of the automation scenario, and matching, by the job scheduler, the idle bot included in the idle bot list to each of the sections included in the parallel execution section list with reference to the expected execution time period and the priority.

The extracting the one or more sections that are executable in parallel may include extracting one or more of a first job type section existing in a set repetitive statement, a second job type section independently and repeatedly using a specific variable a set number of times or more, and a third job type section operable without interaction with a user interface of a target system.

The calculating the expected execution time period may include calculating the expected execution time period of each of the sections with reference to an execution history database in which an execution history corresponding to each job ID is stored, and calculating a value obtained by summing maximum execution time periods of respective activities included in a section corresponding to a specific job ID as an expected execution time period of the specific section, when there is no execution history corresponding to the specific job ID.

The method may further include removing, by the section optimization module, a section having a lowest priority among overlapping sections, when overlapping sections among the sorted sections are present, and repeatedly performing, by the section optimization module, removal according to the priority until the overlapping sections disappear.

The matching of the idle bot to each of the sections included in the parallel execution section list may include selecting a section in which each idle bot included in the idle bot list is usable during an idle time period from among the sections included in the parallel execution section list using the expected execution time period, and matching each selected section to each idle bot in order of higher priority.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, specific example embodiments of the present disclosure will be described with reference to the accompanying drawings. The following detailed description is provided to aid in a comprehensive understanding of a method, a device and/or a system described in the present specification. However, the detailed description is for illustrative purposes only, and the present disclosure is not limited thereto.

In describing the example embodiments of the present disclosure, when it is determined that a detailed description of a known technology related to the present disclosure may unnecessarily obscure the gist of the present disclosure, the detailed description thereof will be omitted. In addition, terms to be described later are terms defined in consideration of functions in the present disclosure, which may vary depending on intention or custom of a user or operator. Therefore, the definition of these terms should be made based on the contents throughout the present specification. The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Figure 1:
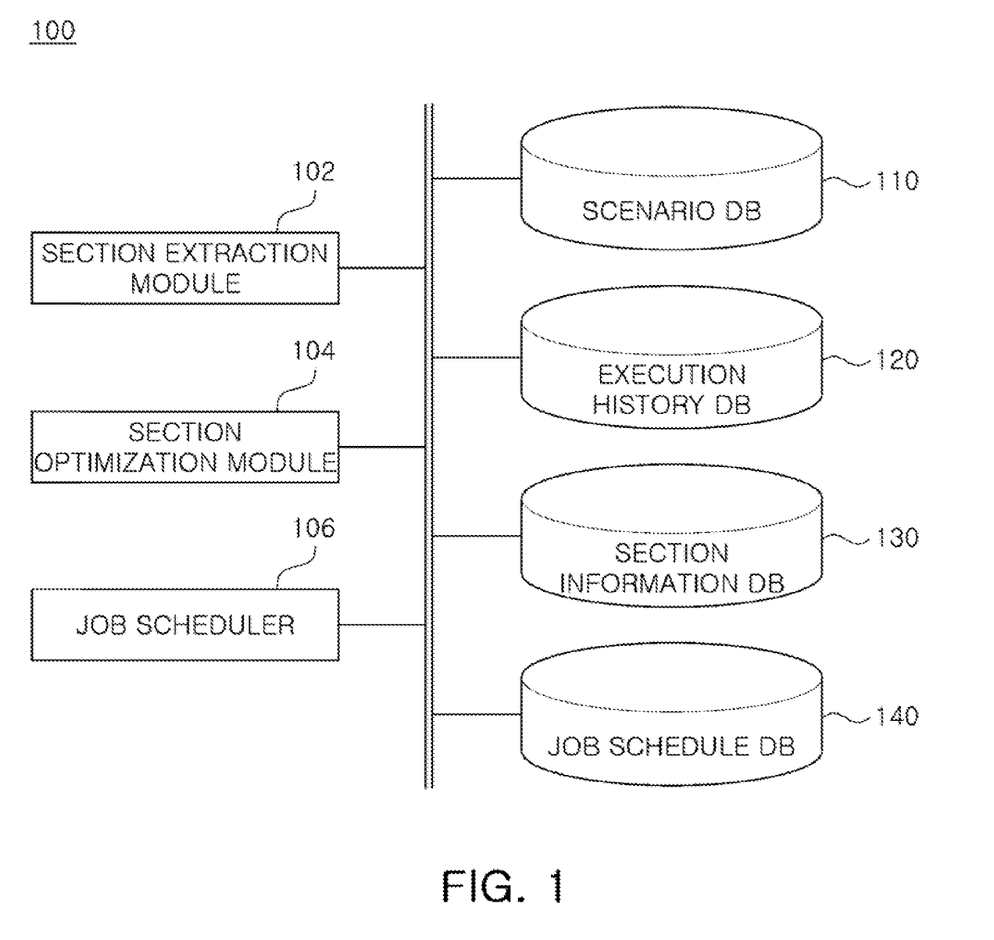
FIG. 1 is a block diagram illustrating a detailed configuration of an apparatus for executing an automation scenario in parallel according to an example embodiment.
Figure 13:
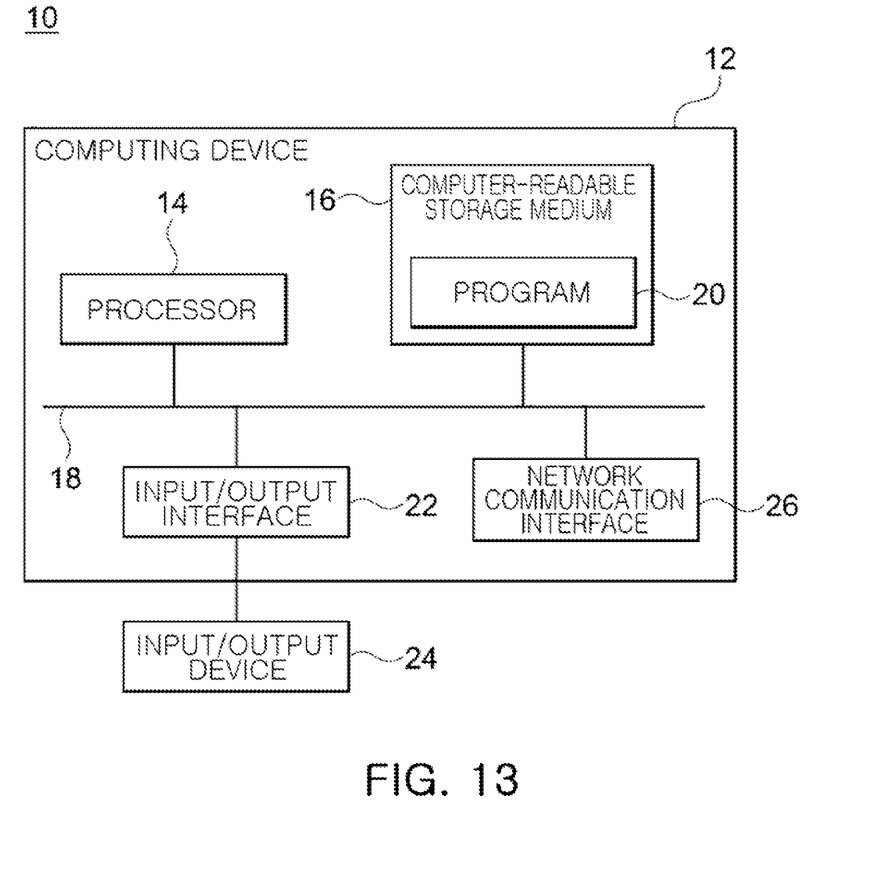
FIG. 13 is an exemplary block diagram illustrating a computing environment including a computing device suitable for use in example embodiments.

FIG. 1 is a block diagram illustrating a detailed configuration of an apparatus 100 for executing an automation scenario in parallel according to an example embodiment. The apparatus 100 may be implemented in hardware or software, or may include a processor and a memory storing one or more programs configured to be executed by the processor, as shown in FIG. 13. The one or more programs include instructions for implementing the following. As illustrated in FIG. 1, the apparatus 100 for executing an automation scenario in parallel according to an example embodiment may include a section extraction module 102, a section optimization module 104, a job scheduler 106, and a scenario database (DB) 110, an execution history database (DB) 120, a section information database (DB) 130, and a job schedule database (DB) 140.

The section extraction module 102 may receive an automation scenario including a plurality of sections, and may extract one or more sections, executable in parallel, for each job type among the plurality of sections based on a script language constituting the automation scenario.

In the present embodiments, the automation scenario, a robotic process automation (RPA) scenario executed by a plurality of automation bots, may be written based on, for example, a script language such as JavaScript, Python, or the like. The automation scenario may be stored in the scenario DB 110, and may include a plurality of sections having different job types. The section extraction module 102 may receive an automation scenario from the scenario DB 110, and may extract one or more sections, executable in parallel, for each job type among the plurality of sections.

Figure 2:
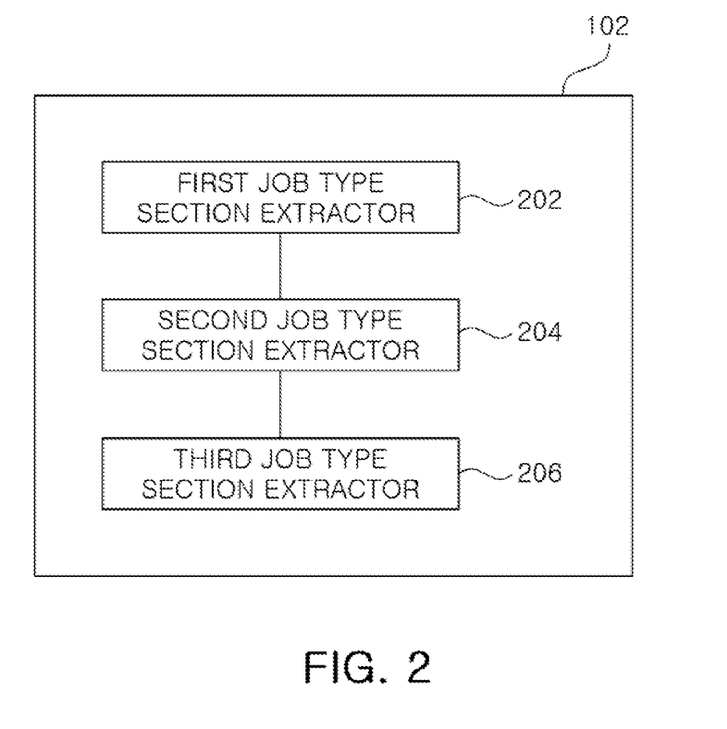
FIG. 2 is a block diagram illustrating a detailed configuration of a section extraction module according to an example embodiment.

FIG. 2 is a block diagram illustrating a detailed configuration of a section extraction module according to an example embodiment. As illustrated in FIG. 2, the section extraction module 102 according to an example embodiment may include a first job type section extractor 202, a second job type section extractor 204, and a third job type section extractor 206.

The first job type section extractor 202 may extract a first job type section existing in a set repetitive statement among sections in an automation scenario. As described above, the automation scenario may be written based on a script language, and accordingly, a repetitive statement such as "For," "For-Each," "While," or the like controlling repetitive execution may be used in a program. A section (first job type section) existing in the repetitive state may be repeatedly executed, and thus may not need to be sequentially executed. Accordingly, the first job type section extractor 202 may extract the first job type section existing in the repetitive statement such as "For," "For-Each," "While," or the like.

The second job type section extractor 204 may extract a second job type section independently and repeatedly using a specific variable a set number of times or more. In general, an automation scenario such as an RPA scenario may repeatedly use a specific variable in a specific section so as to store or use a value therein. A variable used in the automation scenario may affect the execution of the automation scenario, and a section (second job type section) in which the specific variable is repeatedly used a set number of times or more may be separately executed. Accordingly, the second job type section extractor 204 may extract the second job type section in which a specific variable is repeatedly used a set number of times or more in the automation scenario.

The third job type section extractor 206 may extract a third job type section operable without interaction with a user interface (UI) of a target system. In general, an automation scenario such as an RPA scenario may selectively use an automation library according to the target system. In this case, there may be an automated library interacting with the user interface (UI) of the target system, but there may also be an automated library that is operable in a background regardless of the user interface (UI) of the target system. For example, a section including file copy/deletion, batch, or the like that is operable without interaction with the user interface (UI) of the target system (third job type section) may not affect an overall execution result, even when executed in parallel. Accordingly, the third job type section extractor 206 may extract the third job type section operable without interaction with the user interface (UI) of the target system.

Thus, the section extraction module 102 may extract one or more sections, executable in parallel, for each job type (that is, a first job type, a second job type, and a third job type) among a plurality of sections included in the automation scenario.

Figure 3:
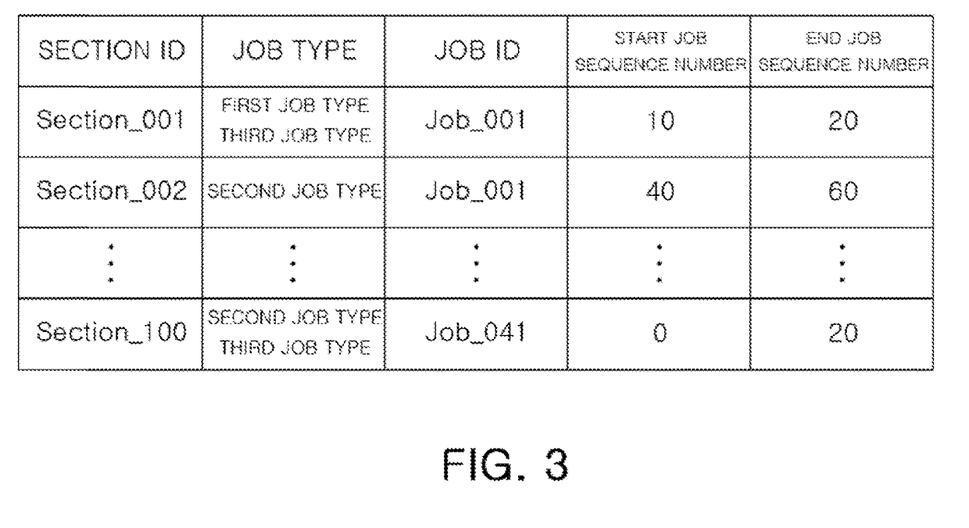
FIG. 3 is an example of respective sections extracted by a section extraction module according to an example embodiment.

FIG. 3 is an example of respective sections extracted by the section extraction module 102 according to an example embodiment.

Referring to FIG. 3, respective sections extracted by the section extraction module 102 may be matched to information such as a section ID, a job type, a job ID, a start job sequence number, and an end job sequence number.

Here, the section ID may be information for identifying each section, and the job ID may be information for identifying a specific job in a scenario to which activities within each section belong. In the present embodiments, an activity, a minimum unit of an automation scenario, means, for example, an action such as a click or a double click. In addition, the start job sequence number refers to a sequence number in a specific job for indicating the start of each section, and the end job sequence number refers to a sequence number in a specific job for indicating the end of each section.

Returning back to FIG. 1, the section optimization module 104 may determine an expected execution time period of each of extracted sections and a priority for each of the sections to optimize each of the sections. Specifically, the section optimization module 104 may calculate the expected execution time period of each of the extracted sections, and may sort the sections based on a priority predetermined for each job type to generate a parallel execution section list. In addition, the section optimization module 104 may remove a section having a lowest priority among overlapping sections when there is the overlapping section among the sorted sections, and may repeatedly perform removal according to the priority until the overlapping sections disappear.

Figure 4:
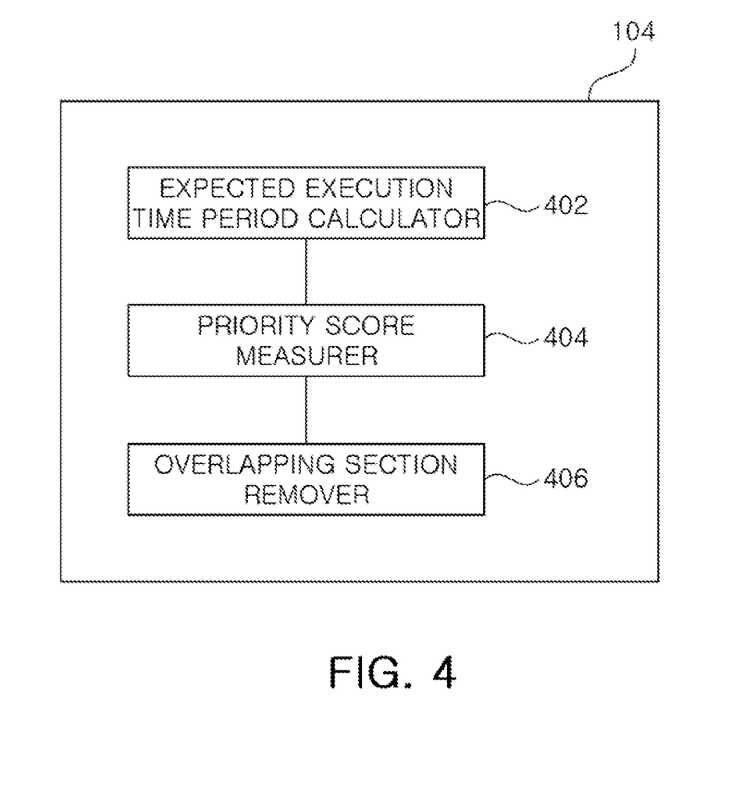
FIG. 4 is a block diagram illustrating a detailed configuration of a section optimization module according to an example embodiment.

FIG. 4 is a block diagram illustrating a detailed configuration of the section optimization module 104 according to an example embodiment. As illustrated in FIG. 4, the section optimization module 104 according to an example embodiment may include an expected execution time period calculator 402, a priority score measurer 404, and an overlapping section remover 406.

The expected execution time period calculator 402 may calculate an expected execution time period of respective sections extracted by the section extraction module 102. Specifically, the expected execution time period calculator 402 may calculate the expected execution time period of each of the sections with reference to an execution history DB 120 in which an execution history corresponding to each job ID is stored. The expected execution time period calculator 402 may inquire the execution history from the execution history DB 120 using each job ID, and may calculate the expected execution time period of each of the sections therefrom. When there is no execution history corresponding to a specific job ID, the expected execution time period calculator 402 may calculate a value obtained by summing maximum execution time periods of respective activities included in a section corresponding to the specific job ID as an expected execution time period of the specific section.

The priority score measurer 404 may generate a parallel execution section list by sorting the sections based on a priority predetermined for each job type. Depending on the situation, the number of sections that are executable in parallel may be greater than the number of idle bots, and thus a priority may need to be given to each of the extracted sections for each job type. That is, the priority score measurer 404 may give a priority for each job type of each of the sections in an order of good efficiency during parallel execution. For example, the priority score measurer 404 may sort the sections according to the priority by giving a higher priority in an order of a second job type (that is, a variable independent type) section, a third job type (that is, a background type) section, and a first job type (that is, a repetitive section type).

<Examples of Giving Priority>
    ex) Second job type→Priority score 5 points
    ex) Third job type→Priority score 3 points
    ex) First job type→Priority score 2 points
    ex) Second job type and First job type→Priority score 5+2=7 points The overlapping section remover 406 may remove a section having a lowest priority (that is, a section having a lowest priority score) among overlapping sections when overlapping sections among the sorted sections are present, and may repeatedly perform removal according to the priority until the overlapping sections disappear. When a section includes another section or partially overlaps each other in a specific portion, it may be necessary to remove the overlapping sections to prevent overlapping execution. In this case, the overlapping section remover 406 may remove the section having the lowest priority among the overlapping sections, and repeatedly perform the removal according to the priority until the overlapping sections disappears. Through such a process, the sections may be sorted, and an optimized parallel execution section list including characteristic information (that is, a priority score and an expected execution time period) for each of the sorted section may be generated. Here, when there are sections having the same priority score, the sections may be sorted in an order of a shorter expected execution time period.

Figure 5:
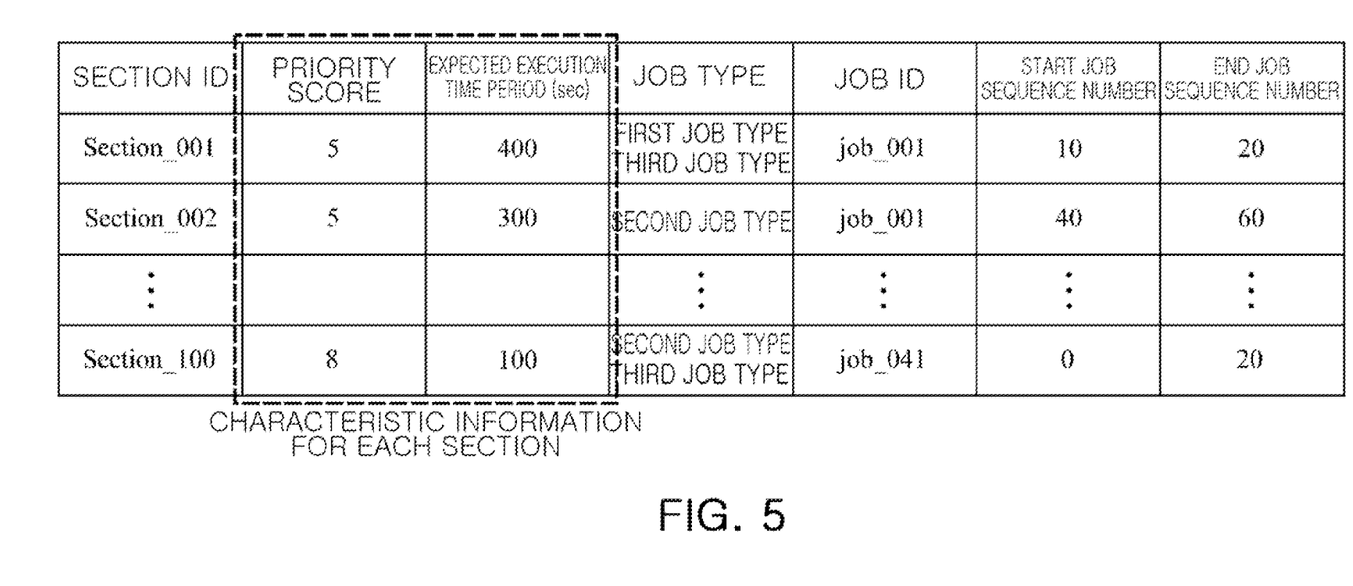
FIG. 5 is an example of a parallel execution section list according to an example embodiment.

FIG. 5 is an example of a parallel execution section list according to an example embodiment.

As described above, sections extracted by the section extraction module 102 may be optimized and sorted through the section optimization module 104. The sections may be sorted based on a priority predetermined for each job type, and overlapping sections may be removed. As illustrated in FIG. 5, the parallel execution section list may include items such as a priority score, an expected execution time period, a job type, a job ID, a start job sequence number, and an end job sequence number of each of the sorted sections. The parallel execution section list may be stored in the section information DB 130.

Returning back to FIG. 1, the job scheduler 106 may generate an idle bot list including an idle bot having an idle state between an execution start time and an execution end time of the automation scenario, and may match the idle bot included in the idle bot list to respective sections included in the parallel execution section list with reference to the expected execution time period and the priority.

Figure 6:
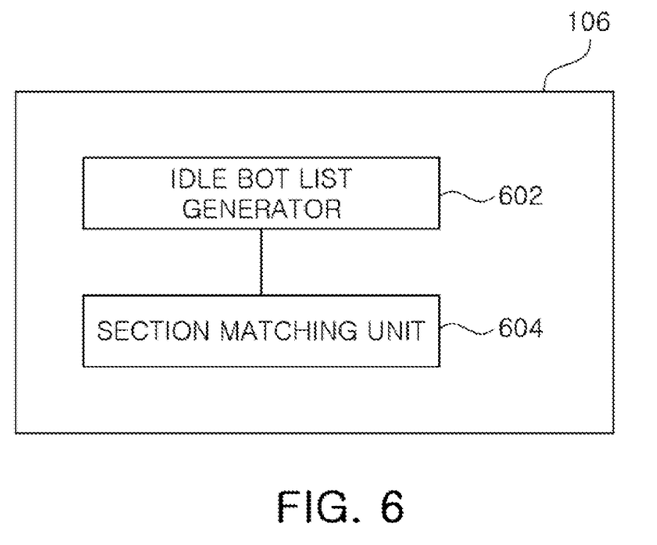
FIG. 6 is a block diagram illustrating a detailed configuration of a job scheduler according to an example embodiment.

FIG. 6 is a block diagram illustrating a detailed configuration of a job scheduler 106 according to an example embodiment. As illustrated in FIG. 6, the job scheduler 106 according to the example embodiment may include an idle bot list generator 602 and a section matching unit 604.

The idle bot list generator 602 may load a schedule of an idle bot having an idle state between an execution start time and an execution end time of the automation scenario with reference to the job schedule DB 140, and may generate an idle bot list therefrom.

Figure 7:
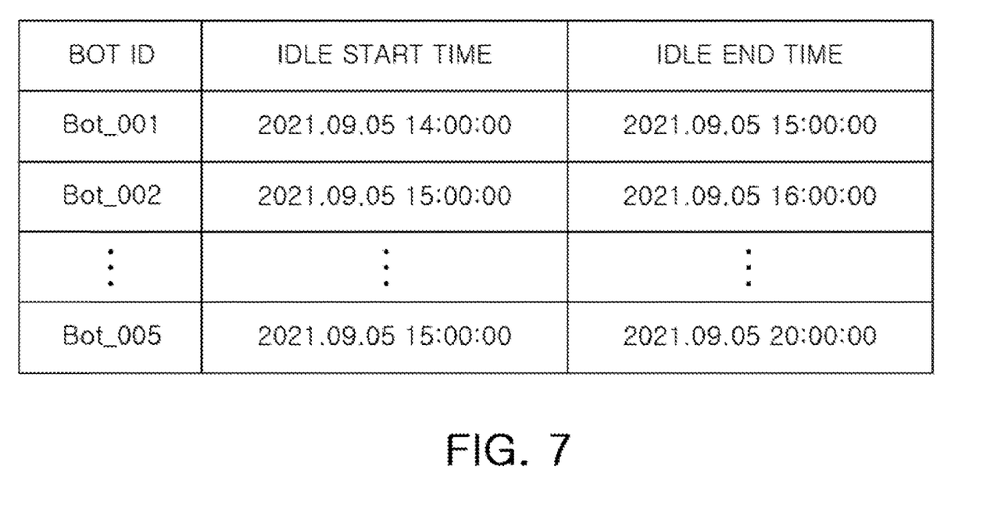
FIG. 7 is an example of an idle bot list according to an example embodiment.

FIG. 7 is an example of an idle bot list according to an example embodiment.

As illustrated in FIG. 7, the idle bot list generator 602 may generate an idle bot list including Bot_001, Bot_002, . . . , and Bot_005 having an idle state between an execution start time and an execution end time of the automation scenario. Here, a bot ID may be information for identifying each bot. In addition, an idle start time refers to a start time at which a state of an idle bot changes to an idle state, and an idle end time refers to a time at which an idle state ends due to an idle bot starting a new job.

The section matching unit 604 may match the idle bot included in the idle bot list to each of the sections in the parallel execution section list with reference to the expected execution time period and the priority. Specifically, the section matching unit 604 may select a section in which each idle bot included in the idle bot list is usable during an idle time period from among the sections included in the parallel execution section list using the expected execution time period, and may match each selected section to each idle bot in order of higher priority. In this case, the section matching unit 604 may match a third job type section to several idle bots in an overlapping manner.

Through such a process, each of the sections included in the parallel execution section list and each idle bot included in the idle bot list may be matched to each other, and accordingly, a parallel execution schedule may be generated.

Figure 8:
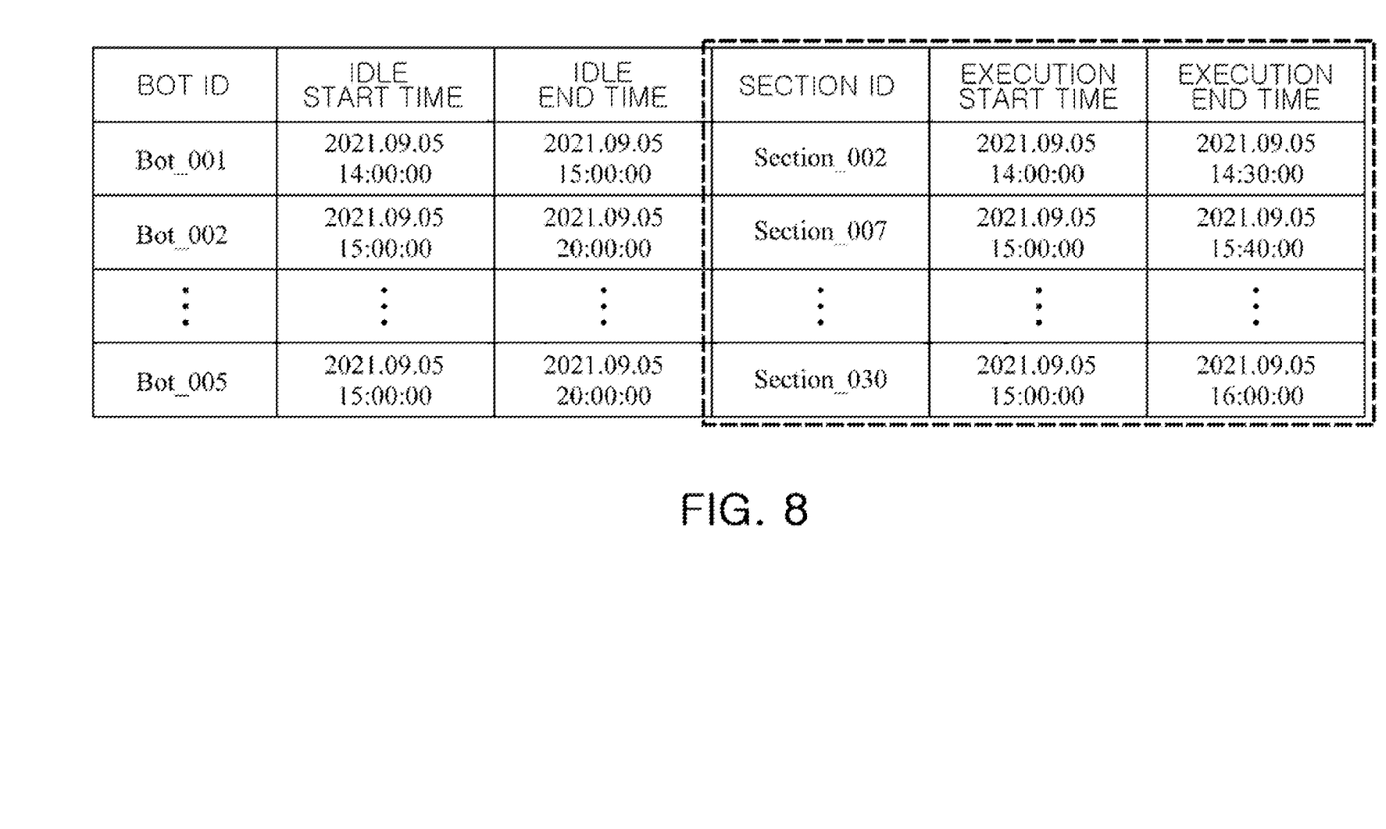
FIG. 8 is an example of a parallel execution schedule according to an example embodiment.

FIG. 8 is an example of a parallel execution schedule according to an example embodiment.

As illustrated in FIG. 8, idle bots (Bot_001, Bot_002, . . . , and Bot_005) included in an idle bot list may be respectively matched to sections (Section_002, Section_007, . . . , and Section_030) included in a parallel execution section list.

Figure 9:
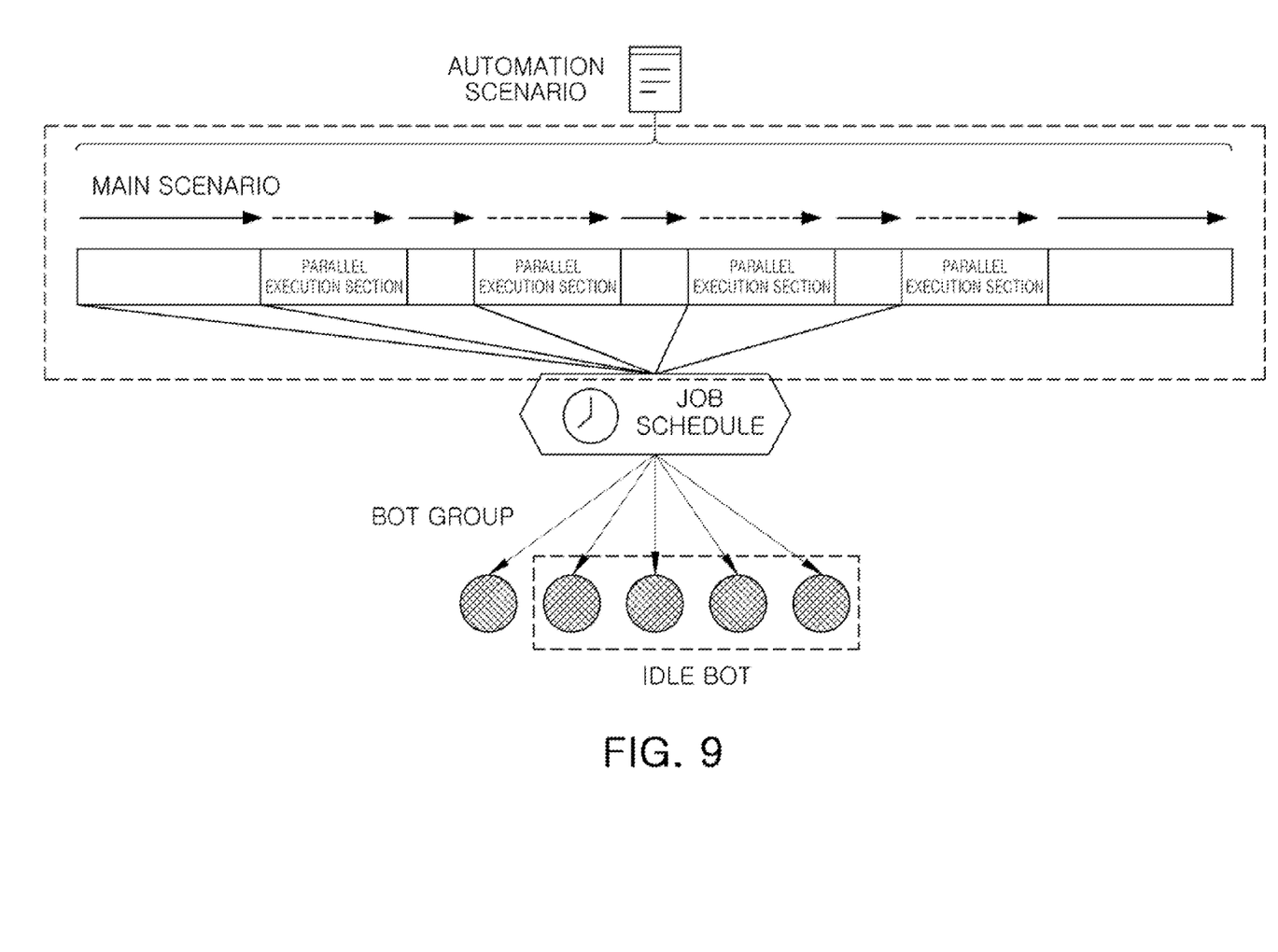
FIG. 9 is an example illustrating a result of matching according to parallel execution of an automation scenario according to an example embodiment.

FIG. 9 is an example illustrating a result of matching according to parallel execution of an automation scenario according to an example embodiment.

As illustrated in FIG. 9, a section that is executable in parallel in an automation scenario, that is, a parallel execution section, may be matched to an idle bot according to the method described above. The boxed portion in FIG. 9 originally represents an idle bot, but may be scheduled to be executed in parallel to execute a parallel execution section according to an example embodiment. Thereafter, results of executing respective parallel execution sections may be collected, and a job of the bot may be terminated.

Figure 10:
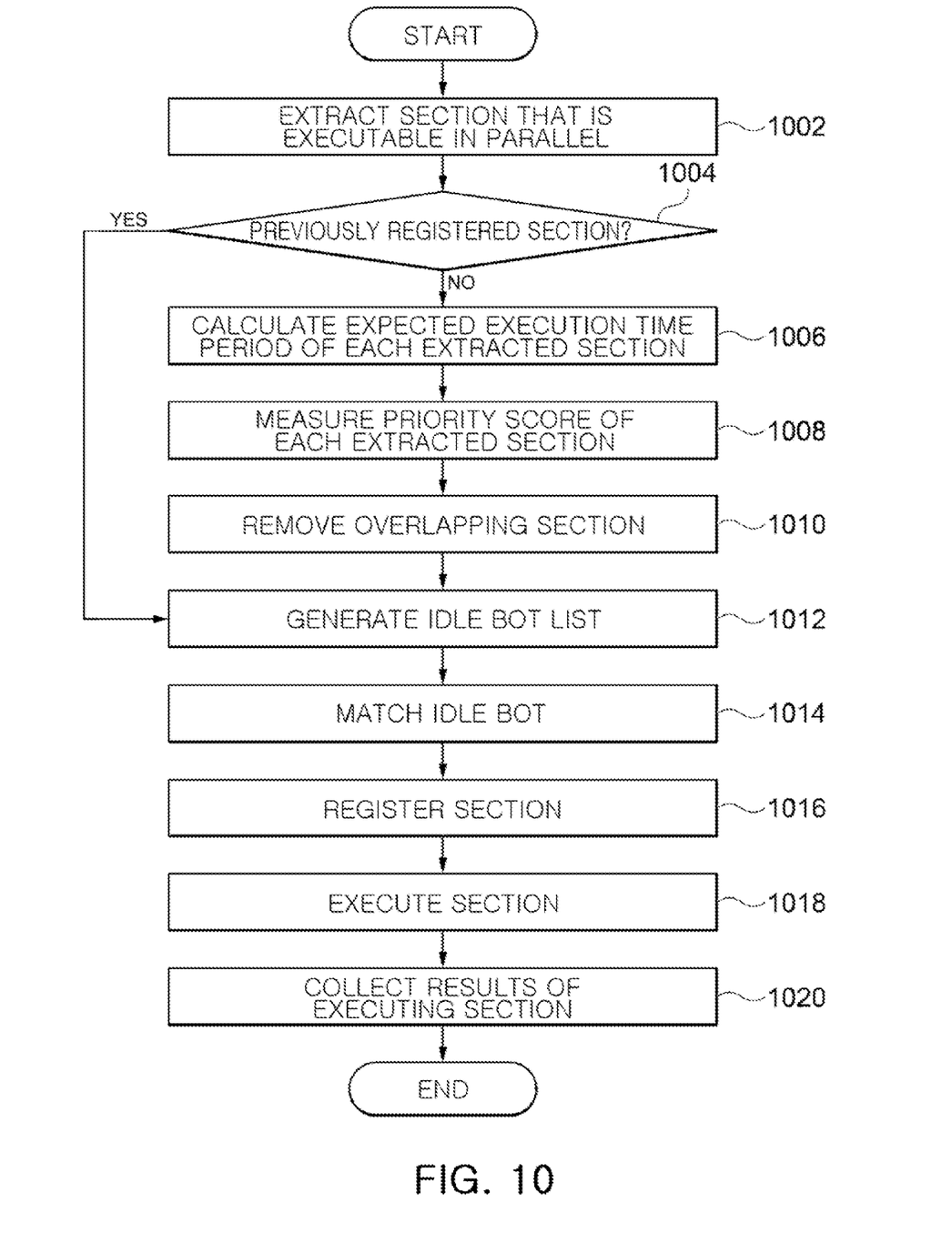
FIG. 10 is a flowchart illustrating a method for executing an automation scenario in parallel according to an example embodiment.

FIG. 10 is a flowchart illustrating a method for executing an automation scenario in parallel according to an example embodiment. In the illustrated flowchart, the method is described in a manner of dividing the method into a plurality of operations, but at least some of the operations may be performed in a different order, may be performed in combination with other operations, may be omitted, or may be divided into sub-operations and performed, or unillustrated one or more operations may be added and performed.

In operation 1002, the section extraction module 102 may extract one or more sections, executable in parallel, for each job type among the plurality of sections based on a script language constituting the automation scenario. As described above, the section extraction module 102 may extract one or more of a first job type section existing in a set repetitive statement, a second job type section independently and repeatedly using a specific variable a set number of times or more, and a third job type section operable without interaction with a user interface (UI) of a target system.

In operation 1004, the section optimization module 104 may determine whether each of the extracted sections is a section previously registered in the section information DB 130. When each of the extracted sections is the section previously registered in the section information DB 130, operation 1012 may be performed without a process of optimizing each of the extracted sections.

In operation 1006, the section optimization module 104 may calculate an expected execution time period of each of the extracted sections when each of the extracted sections is not the previously registered section. The section optimization module 104 may calculate the expected execution time period of each of the sections with reference to an execution history database in which an execution history corresponding to each job ID is stored.

In operation 1008, the section optimization module 104 may measure a priority score of each of the extracted sections. For example, the section optimization module 104 may give a higher priority in an order of the second job type section, the third job type section, and the first job type section, and may sort the sections based on the priority.

In operation 1010, the section optimization module 104 may remove a section having a lowest priority among overlapping sections when overlapping sections among the sorted sections are present, and may repeatedly perform removal according to the priority until the overlapping sections disappear.

In operation 1012, the job scheduler 106 may generate an idle bot list including an idle bot having an idle state between an execution start time and an execution end time of the automation scenario.

In operation 1014, the job scheduler 106 may match the idle bot included in the idle bot list to respective sections included in the parallel execution section list registered in the section information DB 130 with reference to the expected execution time period and the priority. Specifically, the job scheduler 106 may select a section in which each idle bot included in the idle bot list is usable during an idle time period from among the sections included in the parallel execution section list using the expected execution time period, and may match each selected section to each idle bot in order of a higher priority.

In operation 1016, the job scheduler 106 may register a result of matching between each section and each idle bot in a parallel execution schedule.

In operation 1018, the job scheduler 106 may execute each of the sections registered in the parallel execution schedule through one or more bots.

In operation 1020, the job scheduler 106 may collect results of executing the sections.

Figure 11:
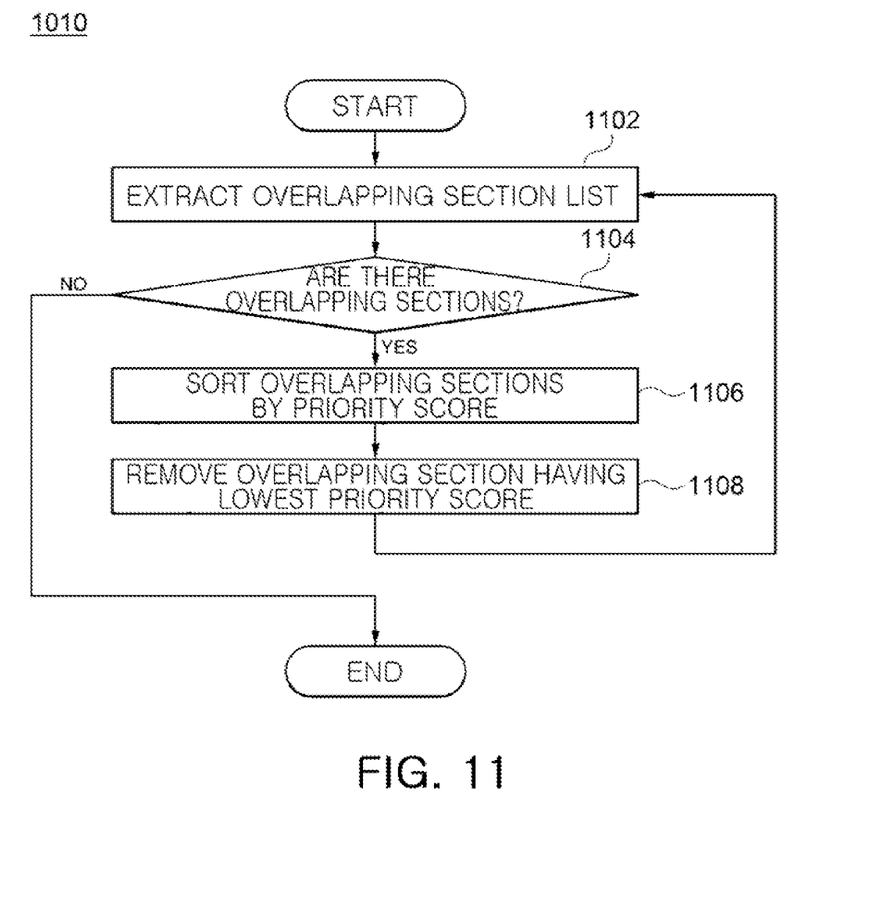
FIG. 11 is a flowchart illustrating operation 1010 of FIG. 10.

FIG. 11 is a flowchart illustrating operation 1010 of FIG. 10.

In operations 1102 and 1104, the section optimization module 104 may extract a list of overlapping sections among the sorted sections.

In operation 1106, the section optimization module 104 may sort the overlapping sections in descending order by priority score when there are then overlapping section among the sorted sections.

In operation 1108, the section optimization module 104 may remove a section having a lowest priority score among the overlapping sections.

Figure 12:
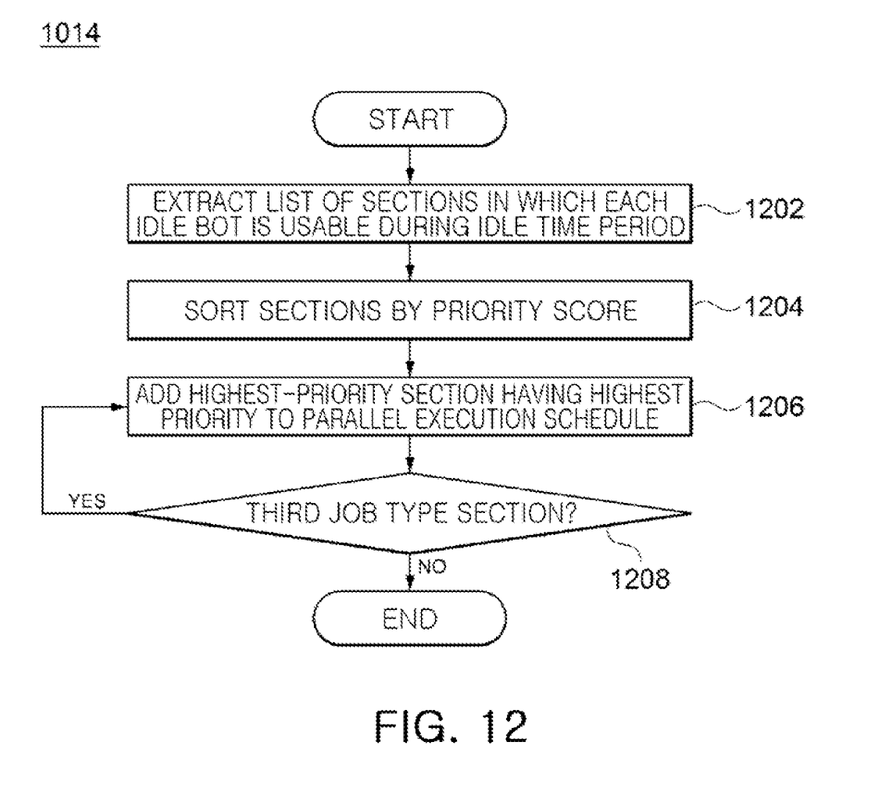
FIG. 12 is a flowchart illustrating operation 1014 of FIG. 10.

FIG. 12 is a flowchart illustrating operation 1014 of FIG. 10.

In operation 1202, the job scheduler 106 may select a section in which each idle bot included in the idle bot list is usable during an idle time period from among the sections included in the parallel execution section list using the expected execution time period.

In operation 1204, the job scheduler 106 may sort the selected sections in which each idle bot in the idle bot list is usable during the idle time period in descending order by priority score.

In operation 1206, the job scheduler 106 may match a highest-priority section having a highest priority among the sorted sections to an idle bot, and may add a result of matching to a parallel execution schedule. That is, the job scheduler 106 may match each of the sorted sections to each idle bot in order of higher priority, and may add a result of matching to the parallel execution schedule.

In operation 1208, the job scheduler 106 may match a third job type section among the sorted sections to several idle bots in an overlapping manner.

FIG. 13 is an exemplary block diagram illustrating a computing environment including a computing device suitable for use in example embodiments. In the illustrated example embodiment, each component may have different functions and capabilities in addition to those described below, and additional components may be included in addition to those described below.

An illustrated computing environment 10 may include a computing device 12. In an example embodiment, the computing device 12 may be one or more components included in the apparatus for executing automation scenario in parallel 100.

The computing device 12 may include at least one processor 14, a computer-readable storage medium 16, and a communication bus 18. The processor 14 may cause the computing device 12 to operate according to the example embodiments described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the example embodiments.

The computer-readable storage medium 16 may be configured to store the computer-executable instruction or program code, program data, and/or other suitable forms of information. A program 20 stored in the computer-readable storage medium 16 may include a set of instructions executable by the processor 14. In an example embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and are capable of storing desired information, or any suitable combination thereof.

The communication bus 18 may interconnect various other components of the computing device 12, including the processor 14 and the computer-readable storage medium 16.

The computing device 12 may also include one or more input/output interfaces 22 providing an interface for one or more input/output devices 24, and one or more network communication interfaces 26. The input/output interface 22 and the network communication interface 26 may be connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touchpad or touchscreen), a voice or sound input device, input devices such as various types of sensor devices and/or photographing devices, and/or output devices such as a display device, a printer, a speaker, and/or a network card. The exemplary input/output device 24 may be included inside the computing device 12 as a component included in the computing device 12, or may be connected to the computing device 12 as a device distinct from the computing device 12.

While example embodiments have been shown and described above, it will be apparent to those skilled in the art that modifications and variations could be made without departing from the scope of the present disclosure as defined by the appended claims.

What is claimed is:

1. An apparatus for executing an automation scenario in parallel, the apparatus comprising:
a processor; and
a memory storing one or more programs configured to be executed by the processor;
wherein the one or more programs include instructions for:
a section extraction module configured to receive an automation scenario including a plurality of sections, and to extract one or more sections of a plurality of job types, from among the plurality of sections based on a script language of the automation scenario, the one or more sections being executable in parallel;
a section optimization module configured to calculate at least one expected execution time period for the one or more sections, and to generate a parallel execution section list by sorting the one or more sections based on priorities predetermined for the plurality of job types; and
a job scheduler configured to generate an idle bot list including an idle bot having an idle state between an execution start time and an execution end time of the automation scenario, and to match the idle bot included in the idle bot list to each of the one or more sections included in the parallel execution section list with reference to the at least one expected execution time period and the priorities.

2. The apparatus of claim 1, wherein the section extraction module is further configured to extract one or more of a first job type section in a set repetitive statement, a second job type section independently and repeatedly using a specific variable a set number of times or more, or a third job type section operable without interaction with a user interface of a target system.

3. The apparatus of claim 1, wherein the section optimization module is further configured to:
calculate the at least one expected execution time period of the one or more sections with reference to an execution history database in which execution histories corresponding to a plurality of job IDs, are stored; and
calculate a value obtained by summing maximum execution time periods of respective activities included in a section of the one or more sections, corresponding to a job ID, as an expected execution time period of the section of the one or more sections, when there is no execution history corresponding to the job ID.

4. The apparatus of claim 1, wherein the section optimization module is further configured to:
remove a section of the one or more sections, having a lowest priority among overlapping sections of the one or more sections, when overlapping sections among the sorted one or more sections are present; and
repeatedly perform removal based on the priorities until there are no overlapping sections.

5. The apparatus of claim 1, wherein the job scheduler is further configured to:
select a section of the one or more sections in which the idle bot included in the idle bot list is usable during an idle time period from among the one or more sections included in the parallel execution section list, using the at least one expected execution time period; and
match the selected section to each idle bot in the idle bot list, in an order of higher priority.

6. A method for executing an automation scenario in parallel, the method comprising:
receiving, by a section extraction module, an automation scenario including a plurality of sections;
extracting, by the section extraction module, one or more sections of a plurality of job types, from among the plurality of sections based on a script language of the automation scenario, the one or more sections being executable in parallel;
calculating, by a section optimization module, at least one expected execution time period of the one or more sections;
generating, by the section optimization module, a parallel execution section list by sorting the one or more sections based on priorities predetermined for the plurality of job types;
generating, by a job scheduler, an idle bot list including an idle bot having an idle state between an execution start time and an execution end time of the automation scenario; and
matching, by the job scheduler, the idle bot included in the idle bot list to each of the one or more sections included in the parallel execution section list with reference to the expected execution time period and the priority.

7. The method of claim 6, wherein the extracting the one or more sections that are executable in parallel comprises extracting one or more of a first job type section in a set repetitive statement, a second job type section independently and repeatedly using a specific variable a set number of times or more, or a third job type section operable without interaction with a user interface of a target system.

8. The method of claim 6, wherein the calculating the expected execution time period comprises:
calculating the at least one expected execution time period of the one or more sections with reference to an execution history database in which execution histories corresponding to a plurality of job IDs, are stored; and
calculating a value obtained by summing maximum execution time periods of respective activities included in a section of the one or more sections, corresponding to a job ID as an expected execution time period of the section of the one or more sections, when there is no execution history corresponding to the job ID.

9. The method of claim 6, further comprising:
removing, by the section optimization module, a section of the one or more sections, having a lowest priority among overlapping sections of the one or more sections, when overlapping sections among the sorted one or more sections are present; and
repeatedly performing, by the section optimization module, the removing, based on the priorities until there are no overlapping sections.

10. The method of claim 6, wherein the matching of the idle bot to each of the one or more sections included in the parallel execution section list comprises:
selecting a section of the one or more sections in which the idle bot included in the idle bot list is usable during an idle time period from among the one or more sections included in the parallel execution section list, using the at least one expected execution time period; and
matching the selected section to each idle bot in the idle bot list, in an order of higher priority.

* * * * *